BLOOD PRESSURE NORMAL RAT

3,784,686
METHOD OF INHIBITING THE ACTION OF RENIN IN HYPERTENSIVE MAMMALS

Richard P. Miller, Zionsville, Ind., assignor to Eli Lilly and Company, Indianapolis, Ind.
Filed Feb. 16, 1972, Ser. No. 226,744
Int. Cl. A61k 27/00
U.S. Cl. 424—94      1 Claim

ABSTRACT OF THE DISCLOSURE

Method of inhibiting the action of resin by pepstatin both in vivo and in vitro, useful in determining presence of renin-associated hypertension.

BACKGROUND OF THE INVENTION

Figure 1:
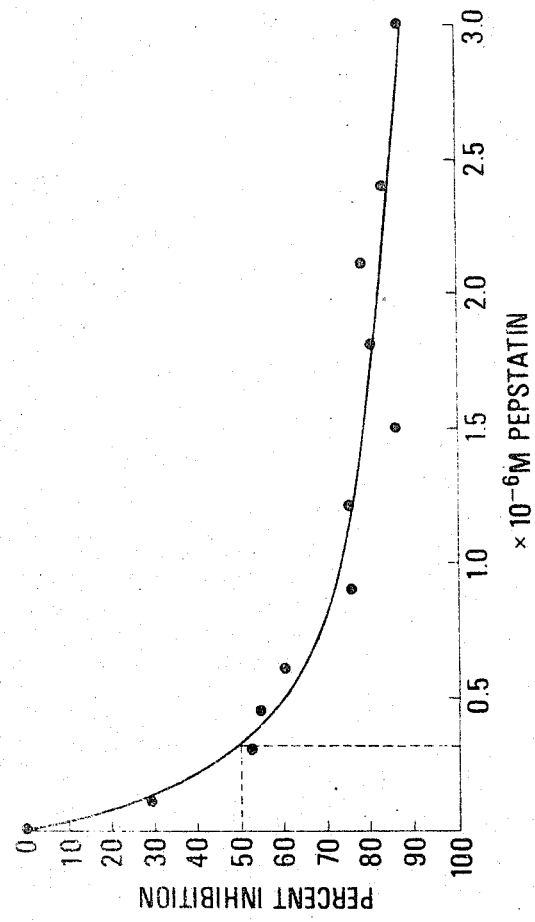

According to Goodman and Gilman, The Pharmacological Basis of Therapeutics, p. 663 et seq., 4th ed., (New York: The Macmillan Company, 1970) renin was first isolated from crude saline extracts of the kidney in 1898. The substance had a marked pressor effect but was of little interest until 1934 when Goldblatt and his colleagues were able to produce hypertension in dogs by constricting the renal artery. Later investigators were able to find renin in the renal venous blood of these Goldblatt dogs. Furter investigation has shown that renin is not itself a pressor substance but is an enzyme that acts on a substance in the plasma known as renin-substrate to produce angiotensin I which is converted to angiotensin II, a powerful pressor substance. It is important for the differential diagnosis of hypertension to know whether the disease is associated with increased plasma levels of renin. The determination of renin in body fluids including arterial blood is complicated and time consuming, frequently requiring more than 24 hours for a determination.

Pepstatin is an elaboration product of numerous species of actinomycetes. Its isolation is described in J. Antibio., 23, 259 (1960). Pepstatin was discovered by Umezawa and co-workers. Its structure is described in J. Antibio. 23, 263 (1970). Pepstatin inhibits the action of pepsin when added to preparations of that enzyme. Pepstatin also prevents ulceration of the pylorus in Shay rats.

It is an object of this invention to provide a method of determining renin both in vitro and in vivo which is both accurate and rapid.

SUMMARY OF THE INVENTION

In fulfillment of the above and other objects, this invention provides a method for inhibiting the action of renin which comprises adding pepstatin to the renin-containing system thus decreasing the activity of renin present. The renin originally present can then be measured usually by determining the pressor effect of the renin-containing system with and without added pepstatin.

When the inhibition of renin by pepstatin is used to determine the amount of renin in a body fluid, both in vivo and in vitro determinations can be used.

In the in vivo assay for renin, pepstatin is injected into the animal at suitable dosage levels, preferably above 50 μg./kg. When injected in this manner, pepstatin produces a transitory fall in blood pressure in Goldblatt rats or in normal rats in whom the blood pressure has been elevated by a continuous infusion of renin. Other mammals having elevated blood pressure associated with above-normal circulating renin levels will also suffer a brief fall in blood pressure when injected with suitable levels of pepstatin. Such a fall in blood pressure is thus indicative of the presence of renin.

With one in vitro assay, the body fluid, usually plasma, can be incubated with pepstatin and, after deproteinization, the amount of pressor peptide produced is measured in the nephrectomized pentolinium-treated rat. In a second in vitro assay, the plasma is mixed with a suitable amount of pepstatin, and the mixture injected into a test animal. The difference in pressor response with and without added pepstatin is a measure of the renin content of the plasma.

It has also been demonstrated that the effect of pepstatin was specific for renin since infusion of a pressor substance completely unrelated to renin gave a sustained rise in blood pressure not affected by the injection of pepstatin. This experiment was carried out in a normal rat in which the pressor substance was infused and pepstatin injected at intervals.

As previously stated, the process of this invention is useful in determining whether hypertension occurring spontaneously in mammals is associated with increased renin levels. Employing my novel in vivo process, it is possible to make a determination of the presence of elevated renin levels in a hypertensive mammal within 5 minutes. About 1 minute after pepstatin has been injected into the hypertensive mammal, the blood pressure begins to fall and will return to the previously elevated level by the end of 5 minutes if no more pepstatin is injected. The in vitro assay takes somewhat longer, but is nevertheless a rapid assay, requiring only a previously prepared animal into whom the renin-containing body fluid can be injected. Injecting the renin-containing material which has been mixed with pepstatin yields a lower increase in blood pressure in a normotensive rat as compared with untreated material. Similarly, injection of the product of the incubation of a renin-containing body fluid with pepstatin into a pentolinium-treated, nephrectomized rat gives a lower pressor response than incubated material to which pepstatin has not been added.

Another use of our novel process is the reduction in blood pressure of actively hypertensive patents associated with increased plasma renin levels (B.P.=280 mm./Hg, for instance) in clinical situations such as cerebral vascular hemorrhage secondary to increased blood pressure where the blood pressure must be reduced very rapidly, at least for short periods of time.

This invention is further illustrated by the following specific examples.

EXAMPLE 1

In vitro inhibition of renin by pepstatin

Renin assaying at 7 to 8 GU/mg. was obtained from a commercial source. The renin was incubated with an excess of crude bovine renin substrate prepared by the method of Skeggs et al. J. Exp. Med., 118 73 (1963), at pH=6.5 and at a temperature of about 37° C. for two hours. The enzymatic reaction was stopped by heating the reaction mixture at about 100° C. for about 10 minutes. The denatured proteins produced during this heating were removed by centrifugation. The supernatant liquid was then assayed for pressor activity in a nephrectomized, pentolinium-treated rat, using angiotensin as the standard. The same enzymatic assay was carried out with different levels of pepstatin being added to the incubation mixture. The inhibition curve shown in FIG. 1 was obtained from such a series of incubations. From the curve, the $EC_{50}$ (effective concentration giving a 50% inhibition of renin for the pepstatin-renin mixture) was determined to be $0.32 \times 10^{-6}$ molar. In a similar experiment, in which dialyzed plasma from a nephrectomized cat was used as a substrate, inhibition of renin was obtained by the addition of pepstatin even up to addition times as late as 40 minutes after the start of a 1 hour incubation period.

EXAMPLE 2

In vivo inhibition of renin activity by pepstatin

A pithed nephrectomized cat was injected with 0.1 GU of renin. The consequent rise in blood pressure was about 21 mm. of mercury. When pepstatin was injected intravenously into the same cat, the later intravenous injection of renin gave a rise in blood pressure of only 10 mm. of mercury. The renin had to be injected within 2 circulation times after the injection of the pepstatin, both being given by the intravenous route, in order for the above lessened pressor effect to be found.

EXAMPLE 3

In vivo inhibition of the action of renin by pepstatin

Figure 2:
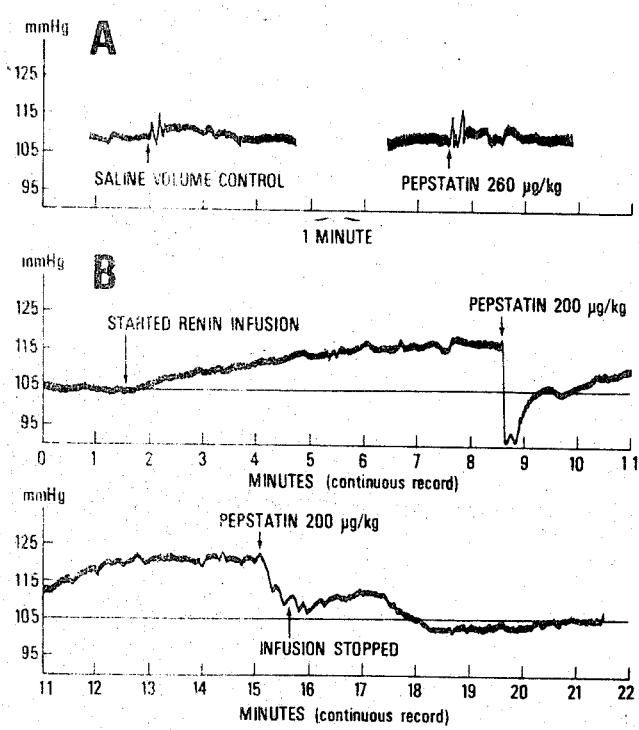

Anesthetized rats were prepared so that their blood pressure could be continuously recorded via the carotid artery while the animals were being maintained with a positive pressure pump. The right femoral vein was cannulated for infusion and the left femoral vein cannulated for injection. Pepstatin injected into normal rats prepared as above at dosage levels up to 260 µg./kg. had no effect on blood pressure. When the blood pressure was elevated, however, by 15–25 mm. of mercury by the continuous infusion of renin into the right femoral vein, the injection of 200 µg./kg. of pepstatin into the left femoral vein reduced the blood pressure to normal in less than 1 minute as shown in the continuing curve in FIG. 2. In this type of preparation, if the infusion of renin was stopped immediately after the injection of pepstatin, the elevated blood pressure produced by the renin infusion returned to normal range 4 times faster than in the absence of pepstatin. These results are recorded in FIG. 2.

EXAMPLE 4

In vivo hypotensive activity of pepstatin

Figure 3:
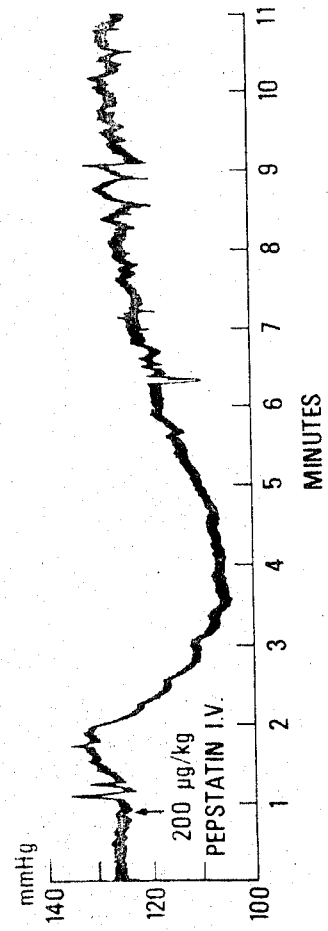
Figure 4:
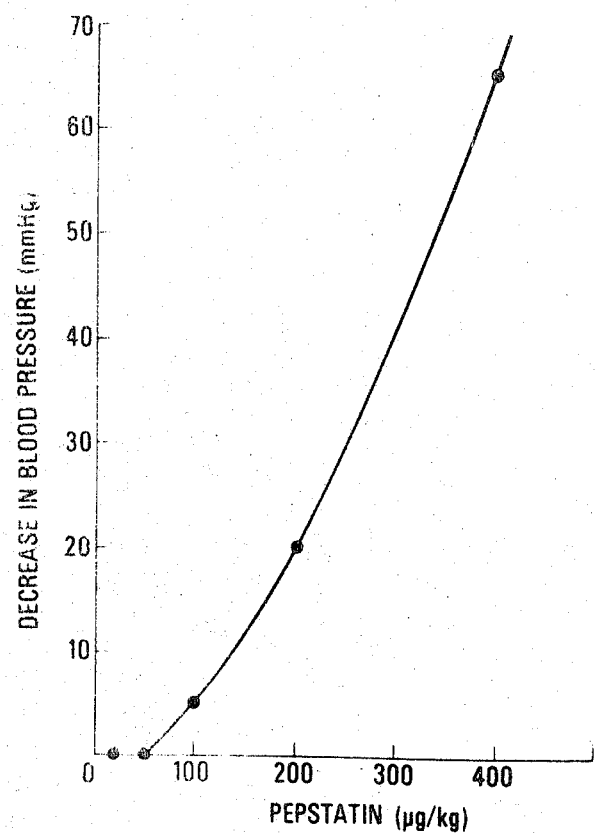

Chronically hypertensive Goldblatt rats were prepared in the same way as the normal rats in Example 2. A definite hypotensive response was obtained by intravenous injection of pepstatin into these Goldblatt rats at dosage levels above 50 µg./kg. as shown in FIG. 3. A dose response curve for pepstatin in Goldblatt rats is given in FIG. 4.

The inhibition of the action of renin by pepstatin is a competitive inhibition as shown by a Lineweaver-Burke plot of the kinetic data. Pepstatin has no effect on the blood pressure of normal rats. Thus, pepstatin is an ideal candidate for use as a clinical diagnostic tool for determining whether a given hypertensive patient has a renin-associated component in his or her hypertension. In employing the process of this invention as a diagnostic aid, the in vivo determination is probably preferable to the in vitro determination in that the former requires only the injection of pepstatin into patients having an elevated blood pressure with a continuous measurement of the blood pressure. In such a determination, an immediate transitory fall of blood pressure would be indicative of a renin-associated component in the hypertensive state. In carrying out the in vivo assay for the presence of renin, the dosages of pepstatin which are employed can vary from 50–1600 µg./kg. of mammalian body weight. The preferred amount of pepstatin employed is 200 µg./kg. of mammalian body weight. The in vitro determination, however, is also relatively easy and is carried out by taking blood from the hypertensive patient, incubating it with renin substrate with and without the addition of pepstatin and then measuring the amount of pressor peptides produced by the difference in effect on blood pressure in normotensive rats. A lowered blood pressure in the presence of pepstatin would be indicative of a renin-associated hypertension.

For intravenous injection into mammals, pepstatin is conveniently dissolved in isotonic phosphate-buffered saline at pH=7.3 or thereabout. The concentration of pepstatin is usually in the range 100–125 µg./ml.

I claim:

1. The method of producing a decrease in elevated blood pressure in mammals associated with increased plasma renin levels which comprises administering an effective anti-hypertensive amount of pepstatin to said hypertensive mammal by the parenteral route.

References Cited

Chemical Abstracts 74: 75201c (1971).

Umezawa et al., J. of Antibiotics, vol. 23, No. 5, May 1970, pp. 259–262.

Morishima et al., J. of Antibiotics, vol. 23, No. 5, May 1970, pp. 263–265.

JEROME D. GOLDBERG, Primary Examiner

U.S. Cl. X.R.

424—9